(12) United States Patent
Jung et al.

(10) Patent No.: US 7,883,129 B2
(45) Date of Patent: Feb. 8, 2011

(54) DETACHABLE HANDLE FOR COOKING CONTAINER

(76) Inventors: Jin-Heon Jung, #2252-1503 Summit Ville Apt, Jindalrae Maeul, Sang-dong, Wonmi-gu, Bucheon-si, Gyeonggi-do, 420-030 (KR); Jae-Bong Son, #104-402 Suseong Heights Suseong-dong 4-ga, Suseong-gu, Daegu, 706-034 (KR)

( * ) Notice: Subject to any disclaimer, the term of this patent is extended or adjusted under 35 U.S.C. 154(b) by 0 days.

(21) Appl. No.: 12/501,886

(22) Filed: Jul. 13, 2009

(65) Prior Publication Data
US 2010/0007158 A1    Jan. 14, 2010

(30) Foreign Application Priority Data
Jul. 11, 2008   (KR) ................. 10-2008-0067443
Feb. 17, 2009   (KR) ................. 20-2009-0001760 U

(51) Int. Cl.
*A47J 45/10* (2006.01)
(52) U.S. Cl. .................. 294/34; 294/31.1; 220/759

(58) Field of Classification Search ............ 294/15, 294/16, 27.1, 31.1, 33, 34; 220/759
See application file for complete search history.

(56) References Cited

U.S. PATENT DOCUMENTS

| 5,704,092 | A  | * | 1/1998  | Nicollet et al. ............. 220/759 |
| 6,000,100 | A  | * | 12/1999 | Montgelard ................ 220/759 |
| 7,478,735 | B2 | * | 1/2009  | Lorthioir et al. ........... 294/31.1 |
| 7,481,330 | B2 | * | 1/2009  | Lorthioir et al. ........... 294/31.1 |
| 7,611,179 | B2 | * | 11/2009 | Lorthioir et al. ............. 294/34 |

\* cited by examiner

*Primary Examiner*—Paul T Chin
(74) *Attorney, Agent, or Firm*—The Farrell Law Firm, LLP

(57) ABSTRACT

A detachable handle for a cooking container. The detachable handle includes a body having a first end with a grasping surface, a cover coupled to a top surface of the body, a movable member movable by a predetermined distance on the top surface of the body and forming a grasping portion that defines with the grasping surface a gap in which a flange portion of a cooking container is inserted, and an operating unit allowing the movable member to slide and fix and release the flange portion of the cooking container.

7 Claims, 4 Drawing Sheets

US 7,883,129 B2

DETACHABLE HANDLE FOR COOKING CONTAINER

PRIORITY

This application claims priority under 35 U.S.C. §119(a) to a Korean Patent Applications filed in the Korean Industrial Property Office on Jul. 11, 2008 and Feb. 17, 2009, and assigned Serial No. 10-2008-0067443 and 20-2009-0001760, respectively, the contents of which are incorporated herein by reference.

BACKGROUND OF THE INVENTION

1. Field of the Invention

The present invention relates to a detachable handle for a cooking container and, more particularly, to a detachable handle for a cooking container such as a pan or a cook-pot, which can be attached and detached to and from the cooking container regardless of a thickness of a sidewall of the cooking container.

2. Description of the Related Art

Generally, a cooking container such as a pan or a cook-pot has a handle essentially so that the user can cook food or carry the container when the container is heated. At least one handle is installed on a flange portion of the cooking container. The handle is separately manufactured and coupled to the container by rivets or bolts.

When the handle is integrated with the container by the rivets or bolts, the handle protrudes from the container. Therefore, the handle makes it difficult to store, package, and carry the container. Accordingly, a detachable handle that can be detachably coupled to the container has been developed.

That is, in order to cook the food using the container or carry the container, the user couples the handle to the container to use the container. When it is intended to store the container, the user detaches the handle from the container to conveniently store the container. The detachable handle is designed to be attached or detached to or from the flange portion of the container. However, since the cooking containers have different thicknesses according to the manufacturing companies and the types of the containers, there is a need to prepare a variety of handles that meet with the respective thicknesses of the containers.

That is, the detachable handle is deigned to be used only when it meets with the thickness of the flange portion of the container. Therefore, when the flange portion of the container has a thickness that does not meet with the detachable handle, the user has to use another detachable handle meeting with the thickness of the container.

SUMMARY OF THE INVENTION

However, when a variety of detachable handles meeting with the respective thicknesses of the flange portions of the containers are used, the costs unnecessarily increase. In addition, the user has to find out a proper handle from the variety of the detachable handles. This is inconvenient for the user.

Therefore, the present invention has been made in an effort to solve the above-described problems. It is an object of the present invention to provide a detachable handle that can be used for a variety of containers having different thicknesses, thereby reducing the costs and improving the convenience.

To achieve the object, the present invention provides a detachable handle for a cooking container, including a body having a first end with a grasping surface, a cover coupled to a top surface of the body, a movable member movable by a predetermined distance on the top surface of the body and forming a grasping portion that defines with the grasping surface a gap in which a flange portion of a cooking container is inserted, and an operating unit allowing the movable member to slide and fix and release the flange portion of the cooking container.

According to an embodiment of the present invention, since the detachable handle can be used regardless of the thickness of the container, the costs can be reduced. In addition, the structure of the detachable handle can be simplified.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE INVENTION

Figure 1:
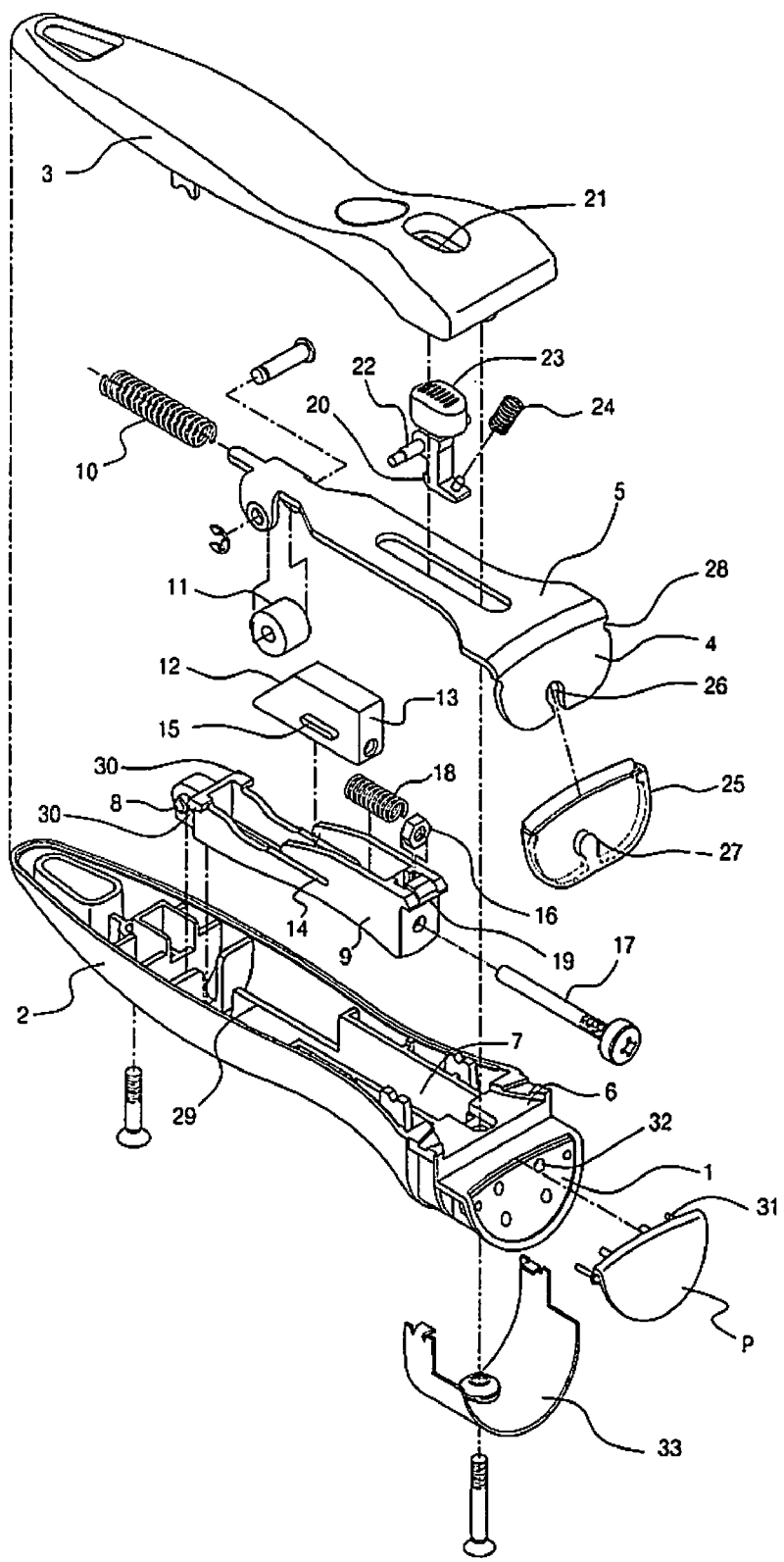
FIG. 1 is an exploded perspective view of a detachable handle for a cooking container according to an embodiment of the present invention.

Below, embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Reference will now be made in detail to the embodiments of the present disclosure, examples of which are illustrated in the accompanying drawings.

Figure 2:
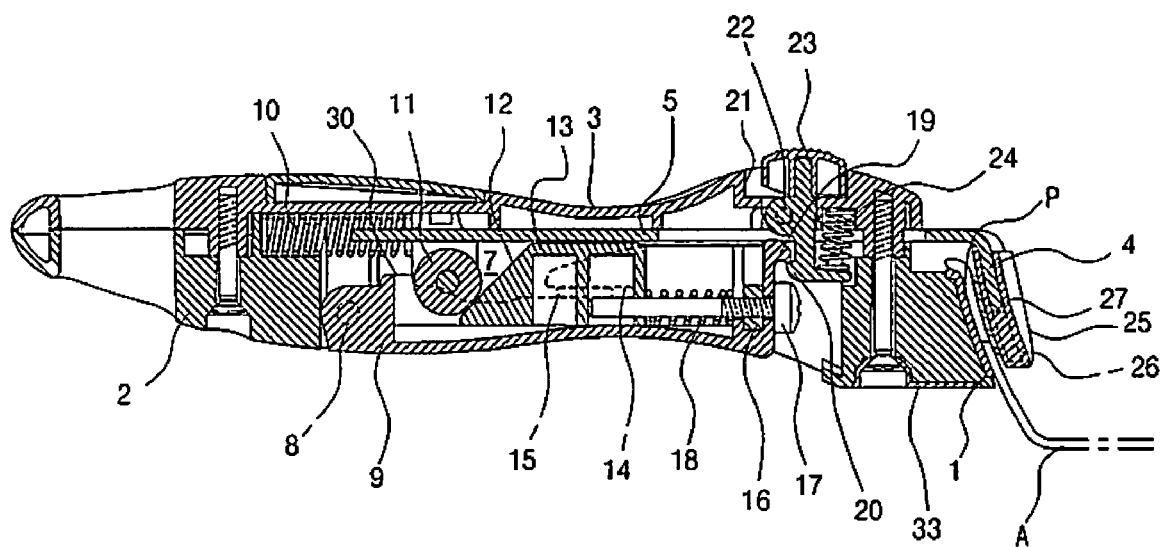
FIG. 2 is a cross-sectional view of the detachable handle of FIG. 1, illustrating a state where the detachable handle is grasping a flange portion of the cooking container by pressing an operational lever.

FIG. 1 is an exploded perspective view of a detachable handle for a cooking container according to an embodiment of the present invention and FIG. 2 is a cross-sectional view of the detachable handle of FIG. 1, illustrating a state where the detachable handle is grasping a flange portion of the cooking container by pressing an operational lever.

A detachable handle of the embodiment includes a body 2 having a first end with a grasping surface 1, a cover 3 coupled to a top surface of the body 2, a movable member 5 movable by a predetermined distance on the top surface of the body 2 and forming a grasping portion 4 that defines with the grasping surface a gap in which a flange portion A of a cooking container is inserted, and an operating unit allowing the movable member 5 to slide and fix and release the flange portion A of the cooking container.

That is, when the user moves the operating unit, the movable member 5 moves forward and backward to grasp the flange portion A or be released from the flange portion A. The movable member 5 is designed to move along a guide groove 6 formed on the top surface of the body 2.

The operating unit includes a receiving portion 7 formed through the body 2, an operating lever 9 that is coupled to an end of the receiving portion 7 by a hinge shaft 8 and is designed to be pressed by a finger, a sliding unit installed between the operating lever 9 and the movable member 5 and moves the movable member 5 backward when the operating lever 9 is operated, a return spring 10 that is installed between the body 2 and the movable member 5 to move the movable member 5 moved backward, and a releasing unit for maintaining a fixed state of the flange portion A or releasing the flange portion by the movable member 5 when the operating lever 9 is pressed.

The sliding unit includes a roller 11 protruding from a bottom surface of the movable member 5 and an operating member 13 that is provided with a hooking surface on which the roller II is hooked so that the movable member 5 moves backward and is installed on the operating lever 9 to be movable by an adjusting unit so that the roller 11 moves forward and backward.

That is, when the operating lever 9 rotates about the hinge shaft 8, the operating member 13 moves the roller 11 forward and backward and then the operating member 5 on which the roller 11 is installed moves forward and backward so that the grasping portion 4 of the movable member 5 is fixed on the flange portion A of the cooking container or released from the flange portion A.

The adjusting unit is provided to adjust a leftward-rightward movable range of the movable member 5 on which the roller 11 is installed by adjusting a location of the operating member 13. That is, the adjusting unit is for adjusting a gap between the grasping portion 4 of the movable member 5 and the grasping surface 1 of the body 2 when the operating lever 9 operates.

The adjusting unit includes a guide groove 14 formed on the operating lever 9, a guide plate 15 that is formed on the operating member 13 to guide the movement of the operating member 13, and a gap adjusting bolt 17 that is screw-coupled to a nut 16 fixed on a front end of the operating lever 9 to adjust the location of the operating member 13 using elastic force of the return spring 10 while rotating and pushing the operating member 13. In addition, a sub-spring 18 is installed between the gap adjusting bolt 17 and the operating member 13 so that the operating member 13 can be stably supported by the elastic force of the sub-spring 18 when the operating member 13 moves by the gap adjusting bolt 17.

The releasing unit includes a hook step 19 formed on a front end of the operating lever 9, a releasing button that is provided with a hooking portion 20 that is hooked on or released from the hook step 19 and rotatably coupled to a through hole of the cover 3 by a hinge shaft 22, and a spring 24 that bias the releasing button 23 so that the hooking portion 20 of the releasing button 23 keeps hooked on the hooking step 19.

Further, the grasping portion 4 is provided with a frictional unit having relatively high frictional force to enhance force for fixing the cooking container. The frictional unit includes a frictional member 25 formed to receive the grasping portion 4 and formed of a silicon material, a stop hole 26 formed on a bottom surface of the grasping portion 4 so that the frictional member 25 cannot be easily released, and a stop protrusion 27 protruding from the frictional member 25 and inserted into the stop hole 26.

The grasping portion 4 is provided at a side surface with at least one wedge groove 28 and the longitudinal end of the frictional member 25 is hooked on the wedge groove 28.

Particularly, a wing hook step 29 is formed inside the body 2 so that the operating lever 9 is not opened over a predetermined angle. That is, the operating lever 9 is provided with a wing portion 30 that is hooked on the wing hook step 29 when the operating lever 9 is opened.

A pad P formed of a silicon material is fixed on the grasping surface of the body 2 to grasp the flange portion of the cooking container with greater frictional force. The pad P is provided with a plurality of insertion protrusions 31 that is pressed into a plurality of insertion holes 32 formed on the grasping surface 1.

Further, a cover 33 is coupled to a bottom-front end of the body 2. The cover 33 serves to prevent the body 2 from being damaged and deformed by heat. The cover 33 is designed to be easily replaced when it is polluted and damaged.

The following will describe an operational effect of the embodiment of the present invention.

Figure 3:
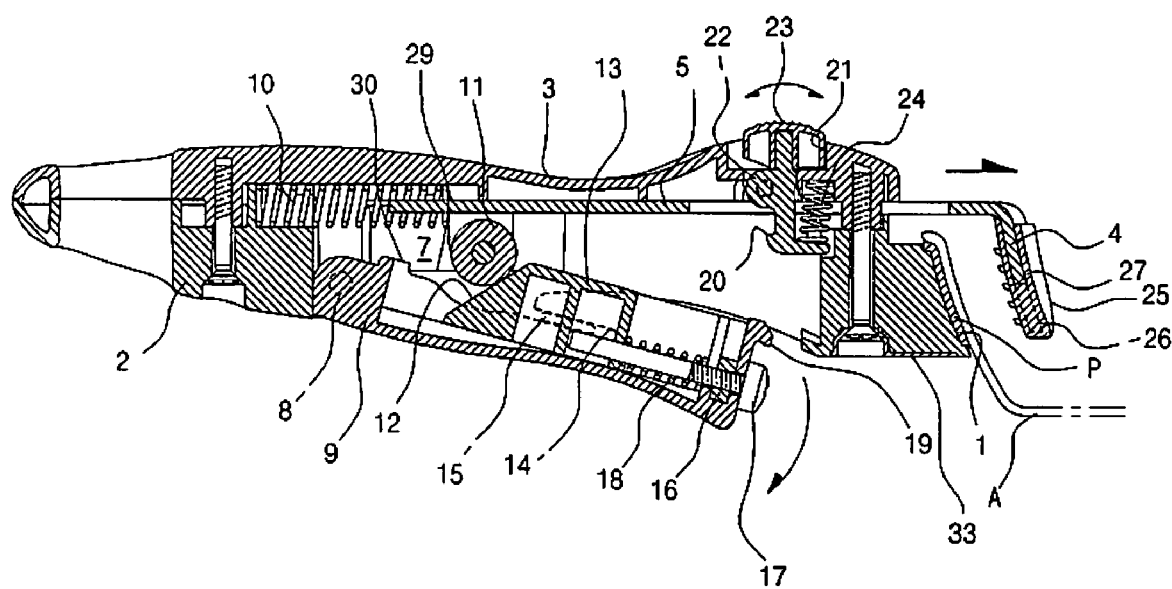
FIG. 3 is a cross-sectional view of the detachable handle of FIG. 1, illustrating a state where the detachable handle is released from the flange portion of the cooking container by releasing the operational lever.

As shown in FIG. 3, when the detachable handle is separated from the cooking container, the operating lever 9 is not pressed and protrudes downward from the body 2. When the lever is in a downward state, the roller 11 and the movable member 5 is biased rightward by the return spring 10 and thus the grasping portion 4 of the movable member 5 maintains a spaced state from the grasping surface 1 of the body 2.

In this state, in order to grasp the cooking container such as the pan using the detachable handle, the flange portion A of the cooking container is located between the grasping portion 4 of the movable member 5 and the grasping surface 1 of the body 2 and then, as shown in FIG. 2, the operating lever 9 is pressed.

When the operating lever 9 is pressed, the operating lever 9 rotates about the hinge shaft 8 counterclockwise, in the course of which the operating member 13 coupled to the operating lever 9 pushes the roller 11 leftward. As a result, the movable member 5 coupled to the roller 11 is pushed leftward while overcoming the elastic force of the return spring 10. When the movable member 5 is pushed leftward, the flange portion A of the cooking container is securely fixed between the grasping surface 1 and the grasping portion 4. As a result, the detachable handle is coupled to the cooking container.

In this state, when the use of the cooking container is finished, the detachable handle is separated from the cooking container and separately stored. That is, as shown in FIG. 3, the user presses the releasing button 23 so that the hooking portion 20 can be separated from the hooking step 19 of the operating lever 9.

When the hooking step 19 of the operating lever 9 is separated from the hooking portion 20, the movable member 5 moves rightward by the elastic member of the return spring 10 and, as the same time, the operating member 13 closely contacting the roller 11 is pushed and thus the operating lever 9 rotates clockwise.

Figure 4:
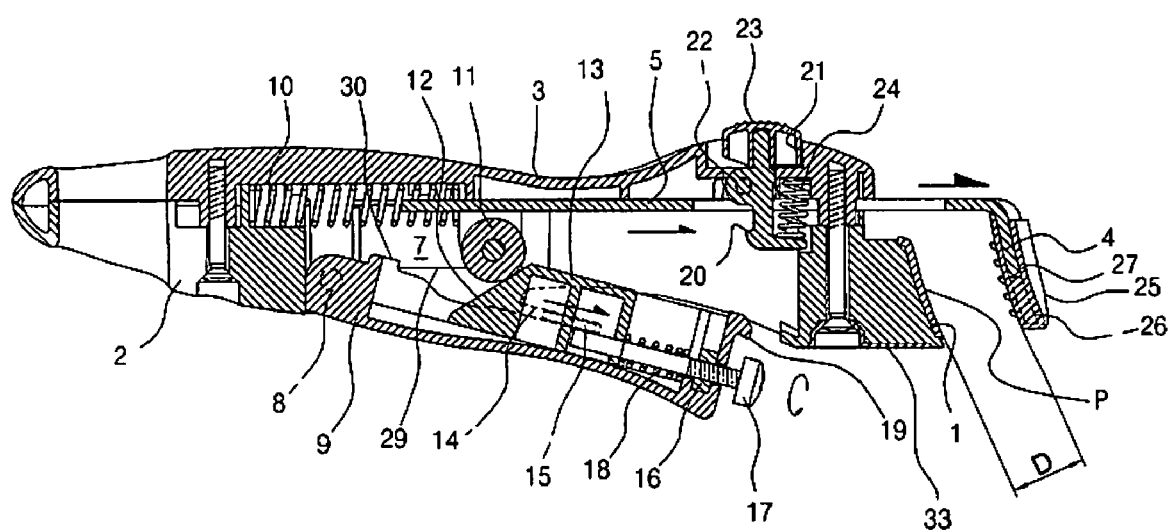
FIG. 4 is a cross-sectional view of the detachable handle of FIG. 1, illustrating a state where a gap between a grasping portion and a grasping surface using a gap adjusting bolt.

As the operating lever 9 rotates clockwise, the movable member 5 moves rightward and thus the detachable handle is separated from the flange portion A of the cooking container. Here, in order to couple the handle to a cooking container having, for example, a thicker flange portion, as shown in FIG. 4, the gap adjusting bolt 17 is released so that the movable member 5 can further protrude rightward.

That is, when the gap adjusting bolt 17 is released, the operating member 13 is pushed rightward by the roller 11 and the return spring 10 and, at the same time, the movable member 5 further protrudes rightward in the drawing.

When the movable member 5 further protrudes rightward, the adjustment by the gap adjusting bolt 17 is stopped at a predetermined location and it is identified if the gap meets with the thickness of the cooking container having the thicker flange portion. When it is identified that the gap meets with the thickness, the user presses the adjusting lever 9 as shown in FIG. 2. Then, the roller 11 and the movable member 5 are pushed leftward to fix the flange portion A.

At this point, since the movable member 5 further protrudes rightward as compared with the state of FIG. 3, a distance D between the grasping portion 4 of the movable member 5 of the body 2 and the grasping portion 4 of the movable member 5 increases and thus the thicker flange portion can be fixed.

That is, the distance D between the grasping surface 1 of the body 2 and the grasping portion 4 of the movable member 5 varies by the distance the gap adjusting bolt 17 moved and the moving distance of the movable member 5 by the adjusting lever 9 does not vary. As a result, the distance between the grasping surface 1 and the grasping portion 4 varies and thus it becomes possible to fix the thicker flange portion.

As the distance between the grasping surface of the body 2 and the grasping portion 4 of the movable member 5 can easily vary, the detachable handle can be easily coupled to the cooking containers having different thicknesses by simply adjusting the gap adjusting bolt 17.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A detachable handle for a cooking container, comprising:
    a body having a first end with a grasping surface;
    a cover coupled to a top surface of the body;
    a movable member movable by a predetermined distance on the top surface of the body and forming a grasping portion that defines with the grasping surface a gap in which a flange portion of a cooking container is inserted; and
    an operating unit allowing the movable member to slide and fix and release the flange portion of the cooking container;
    wherein the operating unit comprises:
    a receiving portion formed through the body;
    an operating lever that is coupled to an end of the receiving portion by a hinge shaft and is designed to be pressed by a finger;
    a sliding unit installed between the operating lever and the movable member and moves the movable member backward when the operating lever is operated;
    a return spring that is installed between the body and the movable member to move the movable member moved backward; and
    a releasing unit for maintaining a fixed state of the flange portion or releasing the flange portion by the movable member when the operating lever is pressed.

2. The detachable handle of claim 1, wherein the sliding unit comprises:
    a roller protruding from a bottom surface of the movable member; and
    an operating member that is provided with a hooking surface on which the roller is hooked so that the movable member moves backward and is installed on the operating lever to be movable by an adjusting unit so that the roller moves forward and backward.

3. The detachable handle of claim 2, wherein the adjusting unit comprises:
    a guide groove formed on the operating lever;
    a guide plate that is formed on the operating member to guide the movement of the operating member; and
    a gap adjusting bolt that is screw-coupled to a nut fixed on a front end of the operating lever to adjust the location of the operating member using elastic force of the return spring while rotating and pushing the operating member.

4. The detachable handle of claim 2, wherein the releasing unit comprises:
    a hook step formed on a front end of the operating lever;
    a releasing button that is provided with a hooking portion that is hooked on or released from the hook step and rotatably coupled to a through hole of the cover by a hinge shaft; and
    a spring that bias the releasing button so that the hooking portion of the releasing button keeps hooked on the hooking step.

5. The detachable handle of claim 1, wherein a wing hook step is formed inside the body so that the operating lever is not opened over a predetermined angle and the operating lever is provided with a wing portion that is hooked on the wing hook step when the operating lever is opened.

6. The detachable handle of claim 1, wherein the grasping portion is provided with a frictional unit having relatively high frictional force to enhance force for fixing the cooking container.

7. The detachable handle of claim 6, wherein the frictional unit comprises:
    a frictional member formed to receive the grasping portion and formed of a silicon material;
    a stop hole formed on a bottom surface of the grasping portion so that the frictional member cannot be easily released; and
    a stop protrusion protruding from the frictional member and inserted into the stop hole.

* * * * *